Oct. 8, 1957   R. DAUB   2,809,079
PISTON HEAD STRUCTURE
Filed March 2, 1956
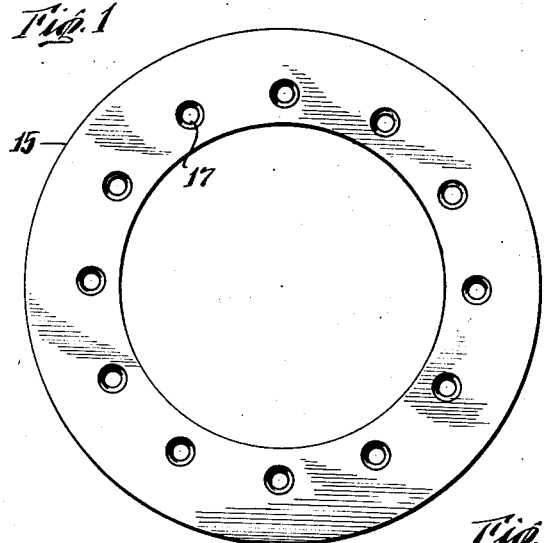
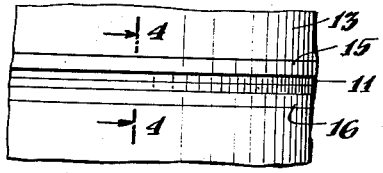
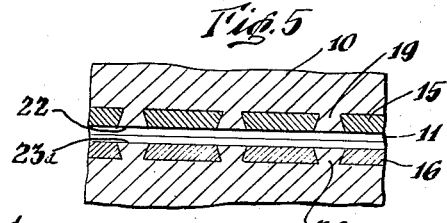
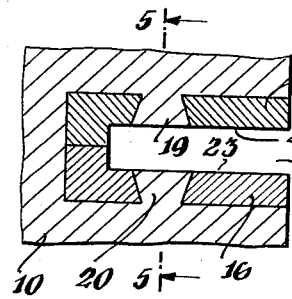
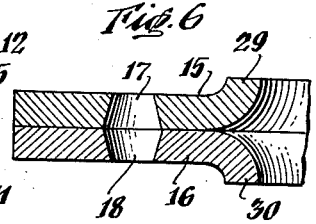
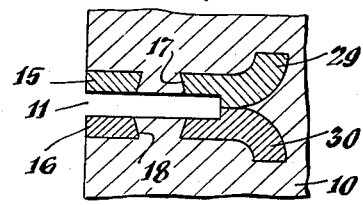
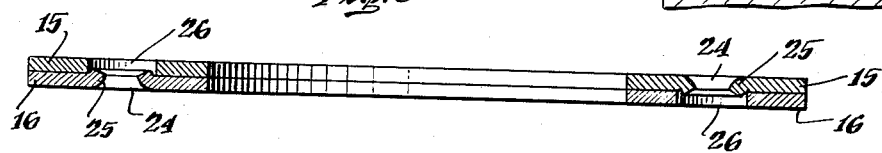
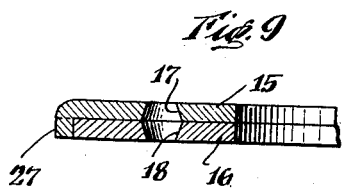
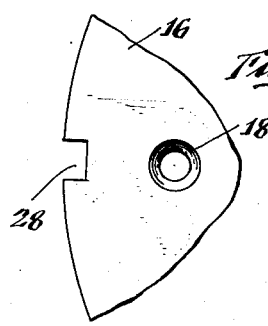
INVENTOR
Rudolph Daub
BY
Frank A. Bower
ATTORNEY United States Patent Office 2,809,079
Patented Oct. 8, 1957

2,809,079

PISTON HEAD STRUCTURE

Rudolph Daub, West Caldwell, N. J.

Application March 2, 1956, Serial No. 569,065

3 Claims. (Cl. 309—14)

This invention relates to pistons for internal combustion engines.

An object of this invention is to provide an internal combustion engine piston with piston ring groove having reinforced walls that are of harder metal than the piston.

Another object of the invention is to provide in the wall of the piston ring groove of an internal combustion engine piston with a reinforcing piece that is securely held in the piston.

Other and further objects of the invention will be apparent from the following description taken in connection with the drawings in which:

Fig. 1 is a plan view of the reinforcing member;

Fig. 3 is a side view of the piston with the reinforcing member;

Fig. 4 is a sectional view of the reinforcing member taken along lines 4—4 of Fig. 3;

Fig. 2 is a sectional view of the case piston;

Fig. 5 is a sectional view of the machined piston taken along lines 5—5 of Fig. 4;

Fig. 8 is a sectional view of paired reinforcing members with keying means;

Fig. 9 is a fragmentary sectional view illustrating another embodiment of the keying means;

Fig. 10 is a fragmentary view of a reinforcing member with a keying slot;

Fig. 6 is a fragmentary sectional view of paired reinforcing members with inner annular rims; and Fig. 7 is a fragmentary sectional view of the machined piston with inner annular rims.

Referring to the drawings the piston 10 is preferably made of aluminum with a top piston ring groove 11 in the cylindrical side 13. The groove is formed in two reinforcing members or rings 15, 16. The rings are formed of a continuous piece of hard steel with the same coefficient of expansion as the aluminum of the piston. The steel is preferably a stainless or austenetic steel. Circumferentially spaced around the rings 15 and 16 are tapered openings 17 and 18 respectively. The rings are preferably identical in size and shape. In Fig. 1 ring 15 is shown to illustrate circumferential arrangement of the openings 17 with the conical surface forming a narrow hole in one surface and a wide hole in the opposite surface. The openings 18 in the ring 16 similarly have conical surfaces with the small holes in one surface and large holes in the opposite surface.

The rings 15 and 16 are placed in pairs in the piston mold with the surfaces having the large holes facing one another and preferably in contact with the openings 15 and 16 aligned so that the large openings are coextensive with one another. On casting of the piston the aluminum alloy metal flows through the openings 17, 18 to form dovetails 19, 20 anchoring the rings in the piston, Fig. 2. The piston is machined forming the side 12 and the piston ring groove 11. The groove is cut into the rings 15 and 16 to a radial depth greater than the inner edge of the dovetail 19, 20 to form an upper steel wear surface 21 with circular aluminum alloy surfaces 22 on the dovetail 19 and lower steel wear surfaces 23 with circular aluminum alloy surfaces 23a on the dovetail 20, Fig. 5. The conical surfaces of the openings 17, 18 facing the piston ring groove 11 wedge the aluminum alloy dovetails 19, 20 against the hammering of the piston ring (not shown) in the groove. The aluminum alloy expands into the openings 17, 18 and is pounded or hammered against the conical surfaces to securely lock the rings 15, 16 in place. Thus the operation of the piston improves and strengthens the bond between the embedded rings and the piston and insures a proper piston ring groove shape and sealing surfaces over extended operation.

In Figs. 6 and 7 the rings 15, 16 are provided with annular rims 29, 30 respectively. The rims extend generally normal to the rings for adding stiffness to the rings. The rims are embedded in the aluminum alloy to provide additional anchorage.

In the manufacture of the piston the rings are matched with the openings in alignment and may be spot welded to hold them in alignment. The rings may be punched, Fig. 8, with a hole 24 having a turned edge 25 to fit in a complementary hole 26, to facilitate the alignment of the openings of the rings. In Figs. 9 and 10 the outer or inner edge may have a prong 27 normal to the ring to fit in a groove 28. A pair of prongs may be provided to fit in opposite grooves so that the rings may be held together by the resiliency of the prongs 27. The rings then can be welded without misaligning the openings 17, 18.

It is thus seen that a continuous steel wear surface may be provided around the piston ring groove on both the upper and lower surfaces of the grooves. The metal insert is inexpensive and does not require maintaining operations such as turning, milling or drilling prior to the casting of the piston. The rings are held securely in the piston to maintain the proper shape of piston ring groove and provide a flat smooth and even sealing surface for the piston ring over an extended piston life.

I claim:

1. A piston structure comprising a cylindrical aluminum alloy piston head, two thin metal rings of harder metal than the aluminum alloy metal embedded in said piston head, a piston ring groove formed radially in said rings with an upper wear surface in one ring and a lower wear surface in the other ring, said rings having openings formed by walls extending through said rings at an angle to said wear surfaces and facing said piston ring groove, aluminum alloy dovetails in contact with said walls to hold said rings in place and having surfaces in the plane of said wear surfaces for engaging a piston ring in said piston ring groove.

2. A piston head structure as set forth in claim 1 wherein one of said rings has an inner rim at an angle to said ring.

3. A piston head structure as set forth in claim 1 wherein said rings have complementary indexing means for aligning said openings and holding said rings together.

References Cited in the file of this patent

UNITED STATES PATENTS

| 2,685,729 | Daub | Aug. 10, 1954 |
| 2,755,151 | Daub | July 17, 1956 |
| 2,771,328 | Wainwright et al. | Nov. 20, 1956 |